US012573238B2

(12) United States Patent
Khan et al.

(10) Patent No.: US 12,573,238 B2
(45) Date of Patent: Mar. 10, 2026

(54) BIOMETRIC FACIAL RECOGNITION AND LIVENESS DETECTOR USING AI COMPUTER VISION

(71) Applicant: ELM, Riyadh (SA)

(72) Inventors: Arshad Ali Khan, Riyadh (SA); Syed Adnan Yusuf, Riyadh (SA)

(73) Assignee: ELM, Riyadh (SA)

( * ) Notice: Subject to any disclaimer, the term of this patent is extended or adjusted under 35 U.S.C. 154(b) by 624 days.

(21) Appl. No.: 17/876,145

(22) Filed: Jul. 28, 2022

(65) Prior Publication Data

US 2023/0206700 A1     Jun. 29, 2023

Related U.S. Application Data

(60) Provisional application No. 63/294,636, filed on Dec. 29, 2021.

(51) Int. Cl.
| | |
|---|---|
| *G06V 40/40* | (2022.01) |
| *G06V 10/774* | (2022.01) |
| *G06V 10/82* | (2022.01) |
| *G06V 40/16* | (2022.01) |
| *G06V 40/18* | (2022.01) |
| *G06V 40/20* | (2022.01) |

(52) U.S. Cl.
CPC ............ *G06V 40/45* (2022.01); *G06V 10/774* (2022.01); *G06V 10/82* (2022.01); *G06V 40/165* (2022.01); *G06V 40/171* (2022.01); *G06V 40/172* (2022.01); *G06V 40/193* (2022.01); *G06V 40/20* (2022.01)

(58) Field of Classification Search
CPC .... G06V 40/45; G06V 40/171; G06V 40/165;

G06V 40/172; G06V 10/82; G06V 40/193; G06V 40/20; G06V 10/774; G06V 10/88; G06V 40/168; G06V 40/16; G06V 40/174; G06T 7/73
See application file for complete search history.

(56) References Cited

U.S. PATENT DOCUMENTS

| | | | |
|---|---|---|---|
| 10,331,942 B2 | 6/2019 | Wong et al. | |
| 2012/0014600 A1* | 1/2012 | Nanu | ................... G06T 5/77 |
| | | | 382/167 |

(Continued)

FOREIGN PATENT DOCUMENTS

| | | |
|---|---|---|
| CN | 106682578 A | 5/2017 |
| CN | 111414817 A | 7/2020 |

(Continued)

OTHER PUBLICATIONS

Tang et al. "PyramidBox: A Context-assisted Single Shot Face Detector" (Year: 2018).*

(Continued)

*Primary Examiner* — Andrew W Bee
*Assistant Examiner* — Winta Gebreslassie
(74) *Attorney, Agent, or Firm* — Oblon, McClelland, Maier & Neustadt, L.L.P.

(57) ABSTRACT

A method, system, and computer readable medium are described to capture, detect, and recognize faces using machine learning and a single-stage face detector. A method to determine live faces from spoof 2D and spoof 3D images using a liveness score as well as a method to classify faces using machine learning deep convolutional neural networks is also described.

17 Claims, 16 Drawing Sheets

(56)                    References Cited

U.S. PATENT DOCUMENTS

| | | | |
|---|---|---|---|
| 2016/0140390 A1 | 5/2016 | Ghosh et al. | |
| 2018/0239955 A1* | 8/2018 | Rodriguez | G06V 40/171 |
| 2018/0349682 A1* | 12/2018 | Wong | G06V 40/172 |
| 2020/0210687 A1 | 7/2020 | Yang | |
| 2020/0334347 A1 | 10/2020 | Hoyos et al. | |
| 2022/0277596 A1* | 9/2022 | Li | G06T 7/64 |
| 2022/0375259 A1* | 11/2022 | Banerjee | G06V 40/45 |
| 2023/0206612 A1* | 6/2023 | Manepalli | G06V 10/62 |
| | | | 382/159 |
| 2023/0326167 A1* | 10/2023 | Mosayyebpour Kaskari | |
| | | | G06N 3/084 |

FOREIGN PATENT DOCUMENTS

| | | |
|---|---|---|
| CN | 111860056 A | 10/2020 |
| IN | 201834033857 A | 3/2019 |
| WO | WO-2019152983 A2 * | 8/2019 |
| WO | WO 2021/015293 A1 | 1/2021 |

OTHER PUBLICATIONS

Jiankang Deng, et al., "ArcFace: Additive Angular Margin Loss for Deep Face Recognition", Proceedings of The IEEE/CVF Conference on Computer Vision and Pattern Recognition (CVPR), arXiv:1801.07698v3 [cs.CV], Feb. 9, 2019, pp. 4690-4699.

Lei Li, et al., "3D face mask presentation attack detection based on intrinsic image analysis", IET Biometrics, The Institution of Engineering and Technology, vol. 9, Issue 3, Mar. 11, 2020, pp. 100-108.

* cited by examiner

606

604

602

1404

1402

1504

1502

BIOMETRIC FACIAL RECOGNITION AND LIVENESS DETECTOR USING AI COMPUTER VISION

CROSS-REFERENCE TO RELATED APPLICATIONS

This application claims priority to U.S. provisional application Ser. No. 63/294,636 filed on Dec. 29, 2021, which is incorporated herein by reference in its entirety.

BACKGROUND

Field of the Invention

The present disclosure is directed to a system and method for distinguishing live from spoofed (faked) images and a method and system for facial recognition and classification.

Description of Related Art

Face biometrics are widely used to identify and verify a person's identity. However, given the widespread use of mobile phones, handheld devices, and the availability of facial data on the internet, it has become quite trivial to misuse identity in a facial biometrics-based recognition application. To address this problem, various approaches have been adopted as part of system and apparatus development. However, previous approaches suffer from major drawbacks including problems of scalability, cross-domain changes, expense of implementation, and the limitation of 2D representations of a human face.

Scalability causes performance issues at liveness detection as well as at recognition level when it comes to accurately recognizing thousands of faces in real time.

Cross-domain differences include age changes, low document quality, and occlusion resolution. An insufficient number of images to extract faces are another challenging problem.

Holistic face-based detection treats the whole-face regions or feature points, e.g., mouth nose, eyes etc. In holistic face-based detection, a matrix of face pixels is converted into feature vectors, ready to be fine-tuned in a low dimensional space. However, such vectors treat each part of the face as equally important. This strategy is sensitive to variations and expressions but at the same time is computationally very expensive to implement in an apparatus or application.

In addition, most conventional face recognition systems and liveness detection techniques are implemented in 2D where some details of the face features are lost owing to the 3D structure of a human face. Pose variation, facial expression variation, lighting, environmental effects are some of the issues that are still unresolved in 2D facial recognition research and applications.

Convolutional neural networks (CNN) are widely used machine learning techniques for image processing and have various implementations. There are two known methods for training a CNN model for face recognition, i.e., (1) a method that trains a multi-class classifier, e.g., SoftMax classifier, and (2) a method that learns the embeddings, e.g., the triplet loss. Both have certain disadvantages. For example, in the SoftMax classifier, as more identities/faces for recognition are added, the greater will be the number of parameters affecting performance. Similarly, in the triplet loss, there is "combinatorial explosion" in the number of face triplets for large scale datasets, leading to a large number of iterations during training.

Accordingly, it is one object of the present disclosure to provide a scalable system and method that is capable of identifying and measuring cross-domain differences and which can detect liveness and 3D structures of a human face.

SUMMARY

A biometric facial recognition method, system and computer-readable medium are described in which a still camera or a video camera captures one or more images of a face. From the image or images, both two dimensional (2D) and three dimensional (3D) features of the face are extracted. Two dimensional images of the face may include, for example, a rate and direction of color change between adjacent pixels of the image, as well as chrominance, luminance and edge detection within the image. Three dimensional key features may include texture information and 3D face structures. Different color spaces such as CIE-LUV, HSV, YCbCr or RGB color spaces may also be considered. Eye blink information is also collected. Based on the 2D features and the 3D features and the eye blink information, a liveness/spoof determination is made, and if liveness is verified, the images are aligned, and the face is matched (or not) with encoded features of a known face stored in a trained neural network model. The trained neural network model used by the face detector may be a pyramid shaped architecture such as offered by RetinaFace or similar architecture. The trained neural network model is previously trained with live faces as well as spoof faces. A "liveness" score associated with the image or images are received from the neural network model which can be compared to a predetermined value to distinguish a real face images from spoof faces (such as spoof pictures downloaded from the internet). Once liveness is determined, an adjustment of the image can be performed, such as, for example flipping the image or adjusting the vertical or horizontal orientation and, the image may then be recognized by an efficient single stage detector module.

The module may use another neural network, such as an additive angular margin loss deep convolutional neural network (DCNN) method to perform an efficient facial recognition. If the image is determined to be live, but recognition is not made, the new image may optionally be added to the future training of the neural network.

The methods described may be used to control access to a restricted area such as to a building or to a vehicle. In yet another embodiment, the methods of the present disclosure may control access to sensitive data, such as on a website or seek to verify the "true identity" as part of an authentication process.

DETAILED DESCRIPTION

In the present disclosure, one or more images are captured and then processed through a face detection model constructed by a deep neural network to obtain key features in the image. The detected image is aligned, by a dedicated alignment module or part of another module to ensure the face in the image is vertical or not according to the face key points. An adjustment is performed by the aligner module, based on the key features to obtain a face image, which is meant to be recognized by the recognizer module.

The key features are features, such as eye, nose tip, mouth corner points, eyebrow, contour points of each part of the face etc. which are extracted from an image, processed after the face detection.

In one embodiment, the method and system of the present disclosure can be used to detect spoofing attacks. Spoofing attacks, also called a spoof face or fake face in this document, are described as one or more of false photos, videos, and masks, that may be collectively aggregated into 2D and 3D categories. Spoofing attacks, may, for example, be launched by mobile or handheld digital devices e.g., a mobile phone, tablet, or other camera mounted handheld device.

Figure 1:
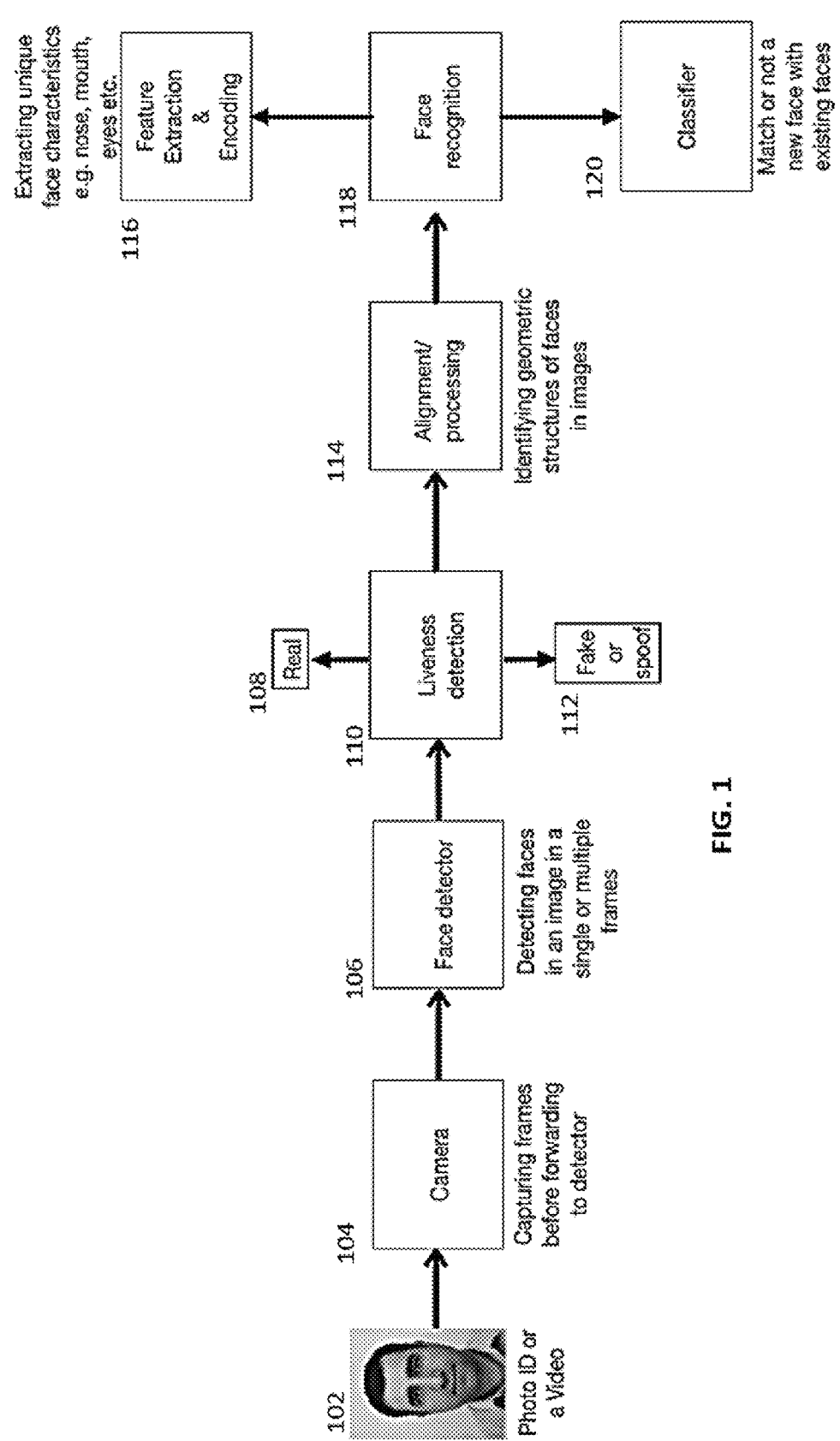
FIG. 1 shows a flow diagram of a video or still camera, facial detector, liveness detector, alignment processing and face recognition modules.

The methods described herein may be used to control access to a restricted area such as a building or a vehicle. In yet another embodiment, the methods of the present disclosure may control access to sensitive data such as on a website, or seek to verify the "true identity" at a point of interest (POI) as part of an authentication process FIG. 1 illustrates a flow diagram of a camera 104, facial detector module 106, liveness detector module 110, alignment processing module 114 and face recognition module 118. The liveness module 110 trains a convolutional neural network model on depth channels of the holistic face, planar channels of the holistic face, and also trains a model on the blinking pattern of eyes to detect accurate blink detection in a specific temporal interval. The utilization of both the visible and depth channels i.e., 2D and 3D, for liveness detection enhancement by training two convolutional neural networks (CNNs) to detect spoofing in faces in the planar or visible channel as well as 3D or depth channel. The alignment processing module 114 (or alignment function as part of another module) aligns the geometrical structure, rotational angle and flip attributes of faces detected from images.

As shown by FIG. 1 a static image or video 102 is captured by a camera 104. The camera 104 forwards the captured frame or frames (in the case of a video) to a face detector module 106. The face detector module 106 detects faces from an image, captured by the camera module; as well chrominance and luminance, 2D/3D, and texture discriminants as well as blinking detection which may be see in a video or in successive static images. Chrominance may include data and statistical comparisons from regions in the CIE-LUV, HSV, YCbCr as well as RGB color spaces. Texture discriminants specifically include edge detection and may include density of pixels which can be used for both classification and segmentation of an image into different textured regions. This can also include the number of edge pixels in a fixed-size region to indicate how busy that region of the image is. Blinking detection is also used and is not limited to the blinking of the eye by shutting and opening it but also includes collecting eye shutting in one of the eyes or both of the eyes for a predetermined amount of time (temporal interval) or until enough input is collected by detector module to generate an authentication score. Continuing with FIG. 1, the face detector module 106 sends data to the liveness detection module 110 which determines a real face 108 or a spoof face 112 with the help of a convolutional neural network (CNN). In the case of a real face, the image is forwarded to alignment processing module 114 which identifies geometric structures of the images of the face. The alignment module 114 crops and align a face for preprocessing purpose before passing it on to the facial recognition module 118. This alignment processing module 114 may include, for example, a flip of the image or establishing boundaries of the face in the image. The image is then passed to the facial recognition module 118 which performs feature extraction 116 and a classifier 120. Feature extraction 116 includes assigning numeric values, or feature vectors, to key features of the face. The classifier 120 can then compare the feature vectors to feature vectors of the known faces which have been pretrained into the neural network in order to, for example determine a match with an existing face or determine a new face.

The liveness model contained in the liveness detection module 110 and face recognition models contained in the facial recognition module 118 are trained models which determine the realness and recognition status of the persons being identified. The training of models is performed using Convolutional Neural Network (CNN) using pre-training model and trainable modelling methods. For example the model may be trained by a randomly selected subset of the set of persons to be identified.

The face recognition is performed by comparing the scores, produced by the trained versus all available feature vectors. The combined score for each face segment then eventually determines whether a face is known or unknown.

Figure 2:
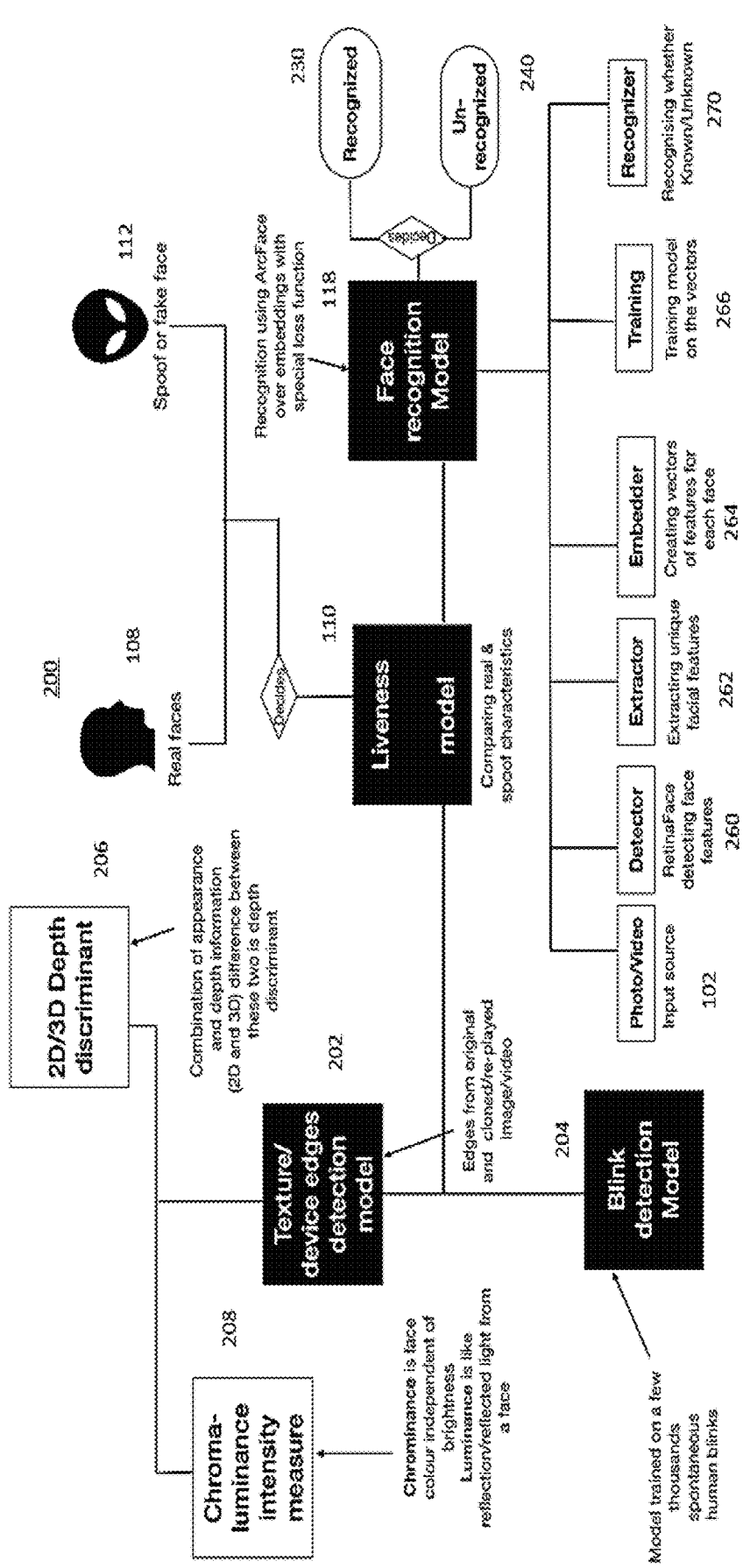
FIG. 2 illustrates more details of the liveness and facial recognition system.

Moving to FIG. 2, FIG. 2 illustrates the high level architecture of the liveness combined with the facial recognition system. In this diagram an image of a real face 108 or a spoof face 112 is passed by a camera (not shown in this figure) to a liveness detection module 110 which contains a liveness model. The liveness detection module 110 takes input from the blink detection module 204, and the texture and live edge detection module 202. The texture and live edge detection module 202, in turn, takes input from chrominance and luminance measurement module 208 and the 2D and 3D depth discriminant module 206. With this information the liveness detection module 110 determines a score corresponding to a live face 108 or spoof face 112. In the case of a real face 108, the static image or video 102 is passed to a previously trained facial recognition module 118. The facial recognition module 118 is previously trained using low quality spoof faces in a grey-scale space, and training using high-quality real face images in a color space. The facial recognition module 118 considers input from the face feature detector 260, the face feature extractor 262, the feature embedder module 264, and the neural network facial recognizer and classifier 270. Each face has different characteristics in terms of structure, size and shape which make it uniquely identifiable. The set of features (vectors) describes prominent features of the facial image. Each face part is extracted in terms of a numeric number which makes part of the vector. Embeddings are then generated ready to be stored and compared with existing faces for recognition purposes.

The facial recognition module 118 can then use this input to decide as to whether the image is recognized face 230 or unrecognized face 240. It is assumed that the neural network facial recognizer and classifier 270 has been pretrained by the facial training module 266. The liveness training entails training 3 convolutional neural networks on depth channels of the holistic face, planar depth channels of the holistic face and training a model on the blinking pattern of eyes to detect accurate blink detection in a specific temporal interval while a face is being classified as a real or fake one.

Figure 3:
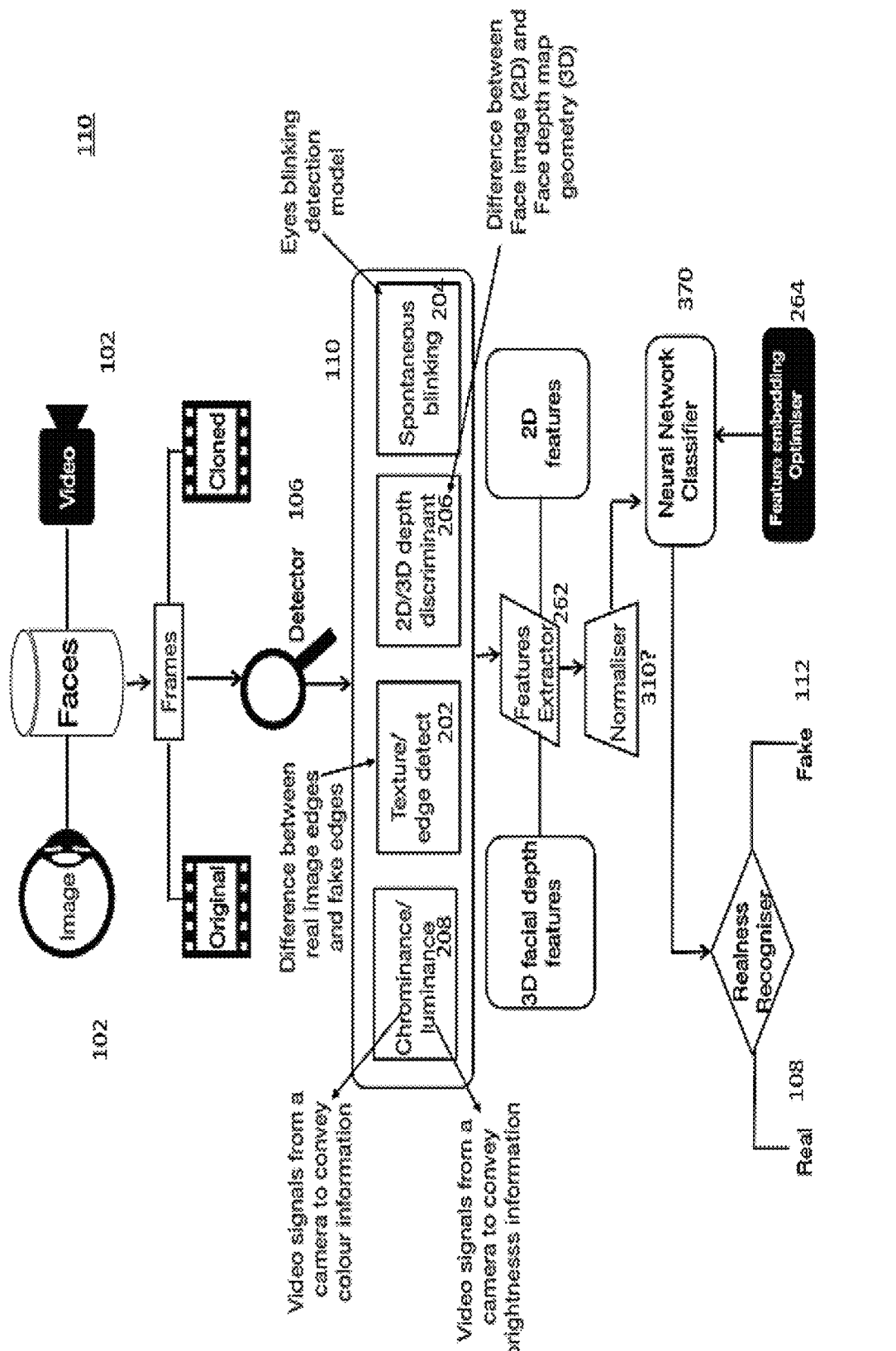
FIG. 3 illustrates a view of the liveness detector module which determines whether the still or video image is real or a spoof.

The utilization of both the visible and depth channels i.e., 2D and 3D for liveness detection enhancement by training two convolutional neural networks (CNNs) to detect spoofing in faces in the planar or visible channel as well as 3D or depth channel FIG. 3 shows another view of the liveness detector module which determines whether the static image or video 102 is real 108 or a spoof 112 (a.k.a. fake). In FIG. 3 we see static image or video 102 passed to face detector module 106. The detector module 106 can detect and extract key features, such as eye, nose tip, mouth corner points, eyebrow, contour points of each part of the face etc. which are the extracted feature points of the face, automatically obtained from an image The face detector module 106 passes the image to liveness detection module 110 which considers input from the chrominance and luminance measurement module 208, the texture and edge detection module 202, the 2D and 3D depth discriminant module 206 and the blink detection module 204 to provide an overall score corresponding to confidence that it is a live image. The verification is performed by comparing the scores, produced by the trained model, planar features and facial depth features as shown in FIG. 3 and also includes the spontaneous blink detection because active liveness detection, on top of the passive liveness detection will result in more accurate realness detection. In another embodiment, changes or movements in facial features or movements in facial features may also be used to determine liveness. In the face feature extractor 262, 2D and 3D facial features are extracted from the image. The image is normalized 310, such as, for example, converting the image to a standard size, and, in one embodiment a score and image features are passed on to a neural network classifier 370 in a classifier module. The neural network classifier takes input from feature embedder module 264 and determines a real face 108 or spoof face 112.

In one embodiment the liveness detector can be used to detect an 3D mask attack as a false face. or a spoof face from a 2D image.

To address the issue of 3D mask attacks, high resolution 3D videos are used to train the CNN models on the high-intensity color image using supervised machine learning (ML) classification methods to detect such attempts at the time of detection and recognition. Channel depth information is computed by normalizing a colored image into a grey image. Therefore, the measurements obtained from the 3D structure of real face will always be different and a true discriminator against the 3D mask-based 3D structure measurements. In other words, the 3D information of a real face and the 3D information of a false face detected by a detector have strong discrimination elements and fusing such characteristics with a heuristic element such as spontaneous blink detection, chrominance and luminance feature of the detected key points provide us a strong base to distinguish a real face from a spoofed one.

Figure 4:
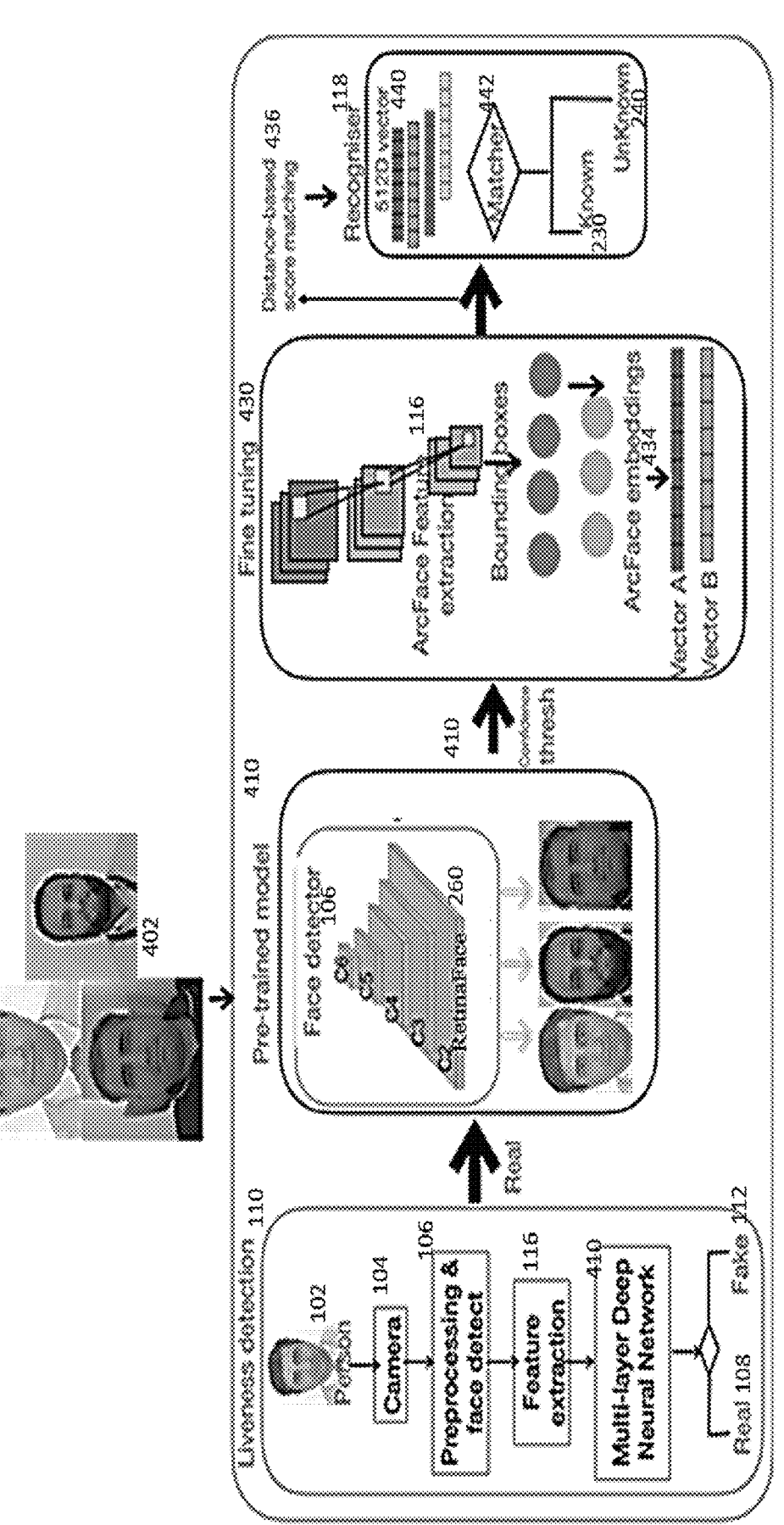
FIG. 4 illustrates more details of how the liveness detector module connects to the facial recognition module.

FIG. 4 shows more details of the liveness and facial recognition system. The liveness detector 110 is included as previously described. As also shown in FIG. 4, the Retina-Face 260 is shown as part of the face detector module 106. The RetinaFace architecture is based on a pyramid shape Neural Network which is also known as FPN (Feature Pyramid Network). RetinaFace 260 is highly scaled and pose-invariant. RetinaFace 260 performs single-stage detections and gives maximum accuracy in real time when detecting a face. The layers in the pyramid show different receptive fields which make it possible for detecting different size of faces. Detection of a face also involves locating a face of that person in an image or a video frame by drawing a bounding box around it. Bounding boxes are comprised of a set of 4 coordinates (x, y, w, h) that typically represent a center point (x,y) and width and height (w,h) of a face in an image. In this embodiment, the face detector module 410 has been previously trained by many photos 402. A training model is developed on features of face segments from both real and cloned faces datasets to ascertain the difference in accuracy when training a model on the whole face images considers texture, color-space, chrominance/luminance features of faces from two different datasets i.e., real faces and cloned faces (using mobile devices). We also look at the closed eyes segmented feature as well as open eye segmented feature in terms of depth channels to further augment the input data we feed into the neural network model. Two sets of cropped or segmented faces are created from the original video image frames and cloned replicas (replayed at various screens). A full-fledged CNN network with at least 10 layers of convolutions, 5 max-pooling and batch normalization and 2 dropout layers with 2 dense and one FC are created as the core model architecture to pass the input from and train the model for unseen real face detection. The above model is then fused together with the Face recognition model and the face recognition system is fully implemented and deployed with liveness detection added.

ArcFace 116 is shown in the fine tuning module 430 of FIG. 4. ArcFace is an additive angular margin Loss deep convolutional neural network (DCNN) method used to perform highly discriminative facial recognition. The ArcFace method contains an embedding model which converts detected faces into 512 dimensions feature maps 440 which can be used by the facial recognizer module 118. The facial recognition module 118 uses a quantification process based on the differences of the embedding vectors, using a cosine similarity distance measures 436 to discriminate the Known 230 and Unknown 240 face. A neural network matcher 442 then performs classification of a live face against all existing embedded face vectors and outputs the result in the form of a known 230 face or unknown 240 face.

In FIG. 4, a real image is passed on, exactly once, to the face detector. Detection of faces can be performed by packaged libraries and techniques e.g., Viola Jones Detector, Histogram of Gradient (HOG), Principal Component Analysis (PCA), MTCNN (Multi-task convolutional neural network) and Dlib face detectors etc. Feature extraction represents a face with a set of feature vector that describes the prominent features of the face image such as mouth, nose, and eye with their geometry distribution. Some face detection models can directly output face images, which are already aligned with key features; the number of the key points of the human face can be 5, such as pupil center points, nose tips, left corners and right corners of two eyes. The number of the key features may also be 68, and the number and specific positions of the key features are not limited. In face recognition, the more key features are detected, the higher the accuracy of face recognition. Each face has a different characteristic in terms of its structure, size and shape which allows to be uniquely identified and recognized. Several methods are used to extract face features like nose, mouth, eyes from a face e.g., HOG, Eigenface Linear discriminant analysis (LDA), Scale Invariant Feature Transform (SIFT), Local Phase Quantization (LPQ), Local Binary Pattern (LBP), Seed-Up Robust Feature (SURF), Binary Robust Independent Elementary Features (BRIEF), Haarcascade etc.

Since the image is passed on to face detector module 106 only once it is faster than a two-stage detector when it comes to detecting faces and generating vectors of features, RetinaFace (RF), a single stage face detector, performs pixelwise face localization on various face scales using joint supervised and self-supervised multitask learning. A confidence threshold 410 or a score from the liveness detector may, in one embodiment, be passed on to the fine-tuning block 430 where NN-based feature extractions 116 is performed to get the bounding boxes and get the points converted to ArcFace-optimized embedding vectors 434. In this figure, the face detector module 410 has been previously trained by many ID and photos 402.

Figure 5:
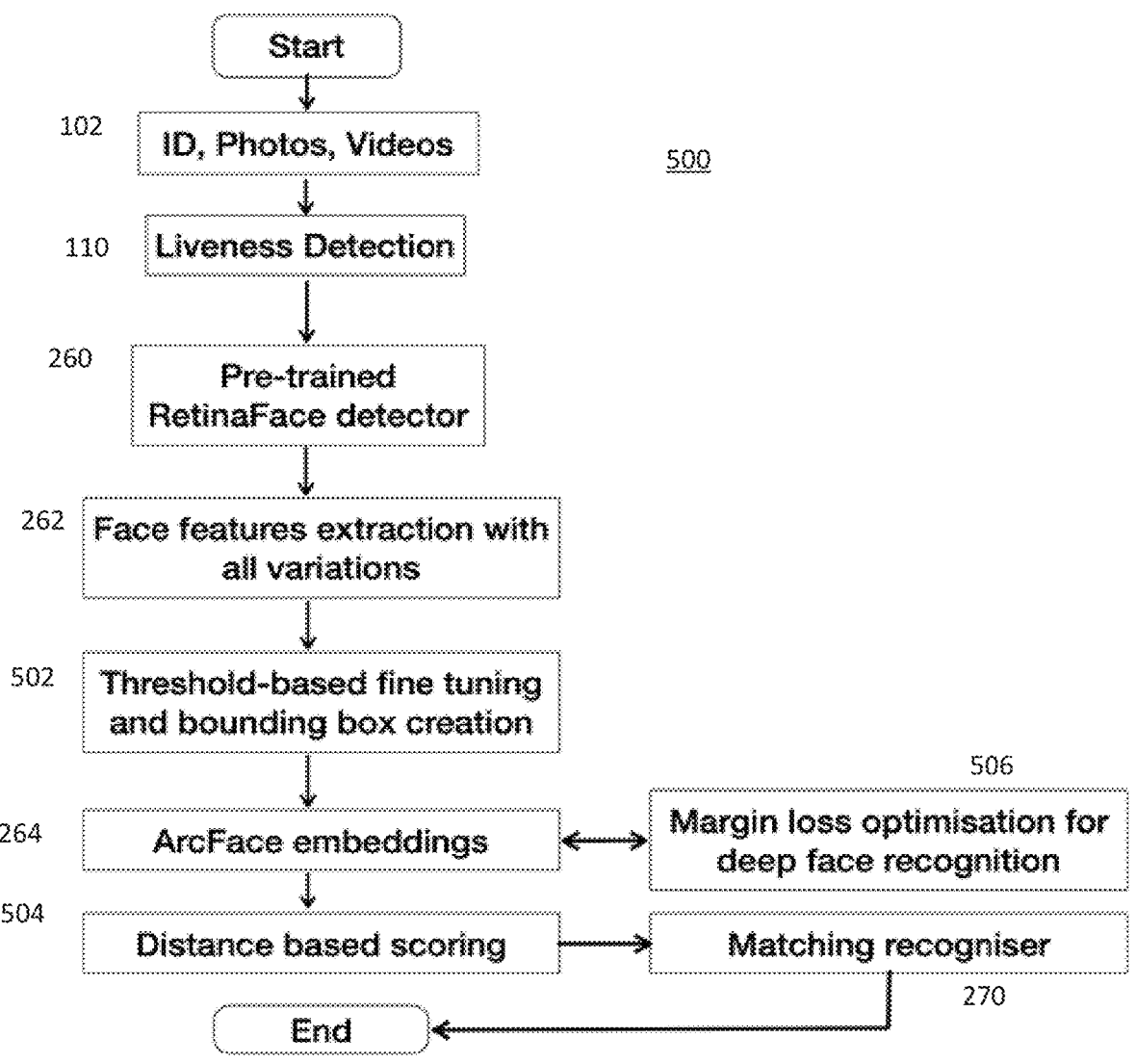
FIG. 5 illustrates the flow from start to end including the liveness detection and the facial recognizer of the present disclosure.

FIG. 5 shows the flow 500 from start to end of the liveness detection and facial recognition modules. Shown is the static image or video 102 capture, followed by liveness detection module 110 and the face feature detector 260. After the face feature detector 260 is the threshold-based fine tuning and bounding box creation 502. After the fine tuning is the feature embedding, which in this case is done by ArcFace which performs additive angular margin loss optimization 506 in the feature embedder module 264. After feature embedding, distance based scoring 504 is performed and then the scores are ready for neural network facial recognizer and classifier 270 which is the end of the flow.

The majority of research initiatives often use face images available online for training, which normally show people with open eyes, i.e. very few images published on the internet show people with closed eyes. The color spaces in which images are read e.g., RGB, HSV and YCbCr play a role at the time of discriminating a live image against a spoof one. We have incorporated the above in all of our experiments aimed at training, tuning, validating and evaluating a particular deep neural network architecture for classifying a real human face as a real or fake face.

Figure 6:
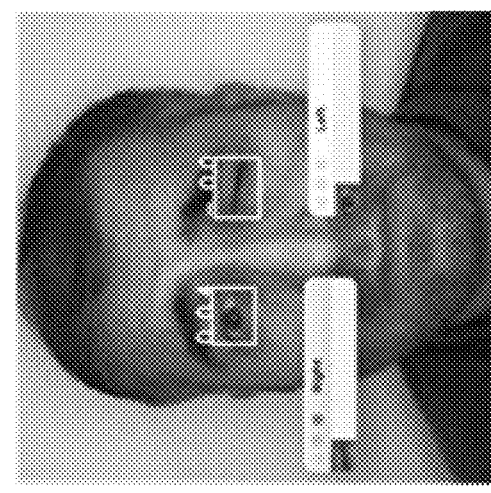
FIG. 6 illustrates sample facial expressions with texture, color gradient features with left eye closed, both eyes open and right eye closed respectively.
Figure 6:
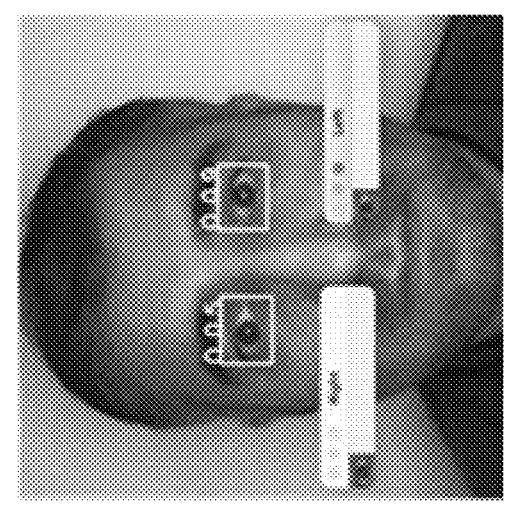
Figure 6:
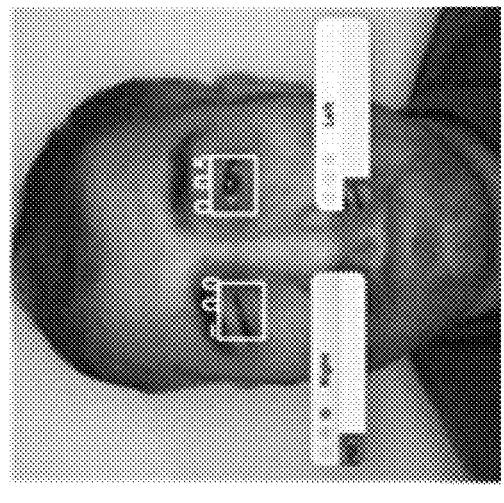

FIG. 6 shows different face poses with left 606 and right 602 eyes closed and both eyes open 604 captured in 3 different frames. Such discriminative face cues, along with other face features are used by the Liveness feature extractor and classifier to distinguish the real face from the fake ones. Due to differences in reflectance properties, real faces present different texture patterns compared with fake faces especially when coupled with different face cues and expressions.

Figure 7:
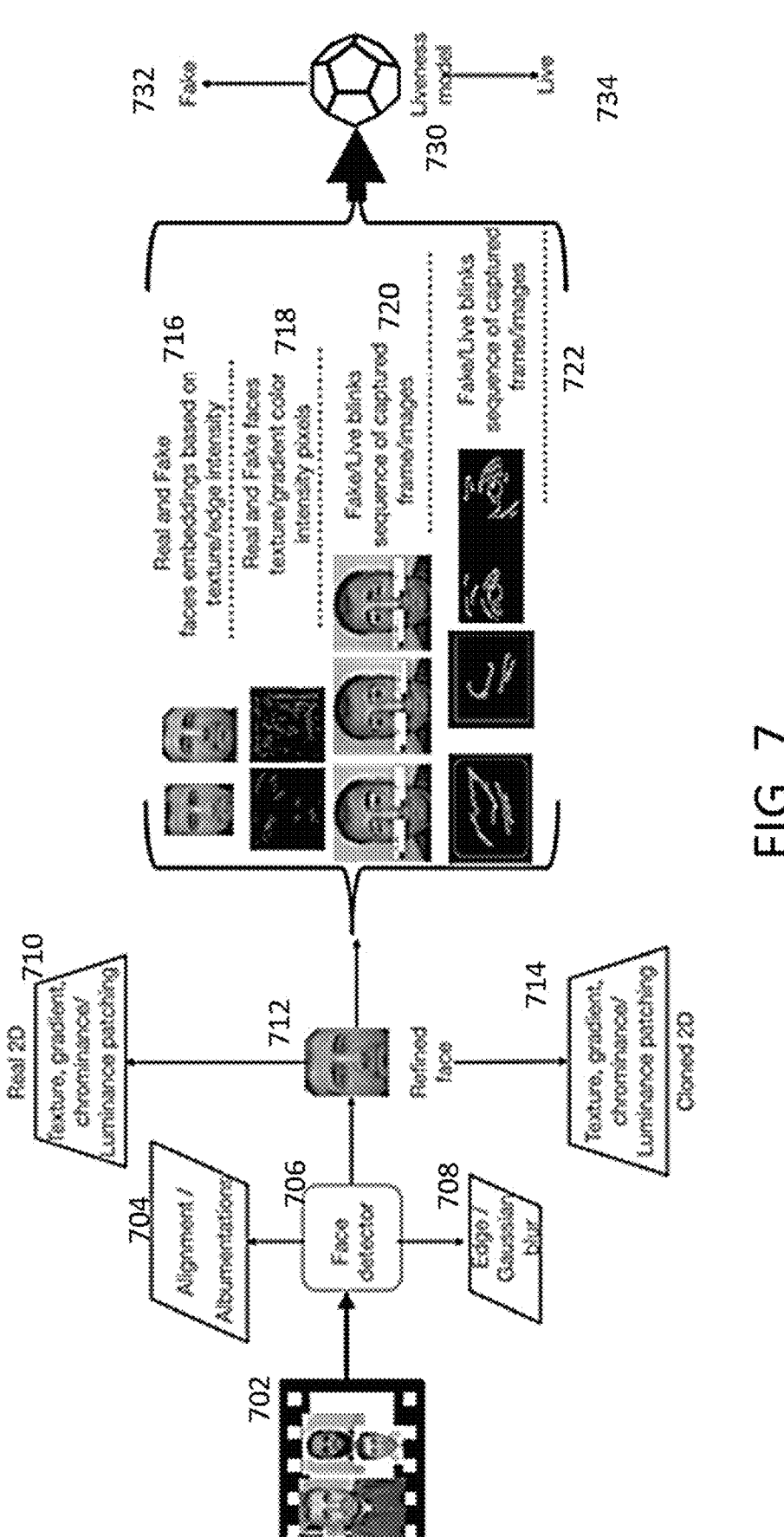
FIG. 7 illustrates discriminative facial segmentation for liveness detection.

FIG. 7 further explains the overall image processing, image augmentations (also known as albumentations) 704, edge intensity detection 708, gaussian blurring after the face detection 706 in an image. FIG. 5 further distills the real 710 and cloned 714 2D face by taking patches from both based on implicit texture gradient color, chrominance/luminance strength to be used as discriminants for separating real 710 and fake 714 2D face images. The Liveness module 730 take the embeddings 716 as input which include texture/gradient color intensity 718 pixelated portions of real and fake faces as well as the blink information 720 722. The embeddings further include blinks of left and right eye 720 face cues with open and closed states of both eyes. The Liveness model classifier uses a unique neural network architecture to distinguish a real face 734 from the fake 732 ones. The neural network architecture will be explained in subsequent sections.

Figure 8:
FIG. 8 illustrates open and closed eyes in the dataset, used for a deep learning model training.
Figure 9:
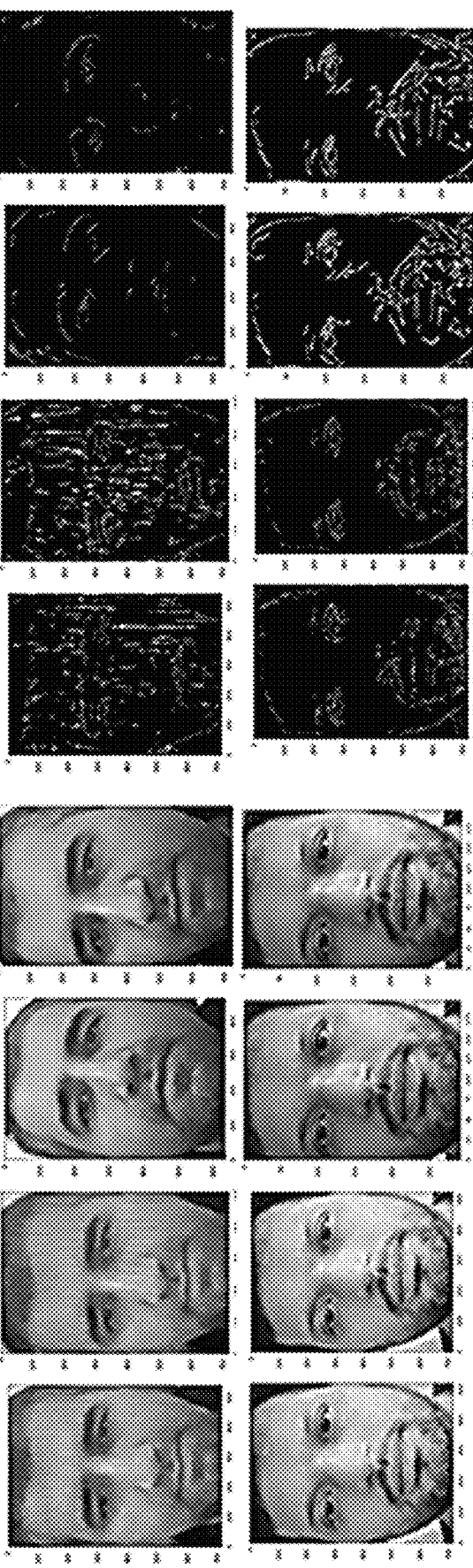
FIG. 9 illustrates both Real and Fake 2D face images with gradient color intensity visualization for real-fake discrimination optimization.

In order to recognize an eye whether open or closed, an eye contour localization and extraction is performed followed by a full-face detection. A Convolution Neural Network (CNN) model is trained on a dataset containing open and closed eyes as shown in FIG. 8 before creating fully visible original and fake 2D faces. The model parameters and CNN architecture, used for building the open/closed eye model training has been given such as shown by the open and closed eyes shown in FIG. 8. Spatial facial features, combined with intrusive left/right eyes open/close detection enhance the discriminative density of face embeddings before finetuning the Liveness model on the embeddings. Real and fake facial features are concatenated with the eyes open/closed regression score (produced by the blink NN) and the Liveness classifier use the Euclidean distance score between the real and fake actual face and the 2D versions before outputting a determination as to a real or fake face. We apply different techniques before the image is ready to be passed on to the liveness trained model. That includes noise reduction, edge intensity identification, storage, and gradient computation. The core difference between a Live and Fake image is the change of intensity of pixels in both images. In order to detect, store and compare both, in real-time, is to apply further filtering techniques to highlight the intensity change on both axis in a 2D image i.e. X-axis and Y-axis. Since edge detection is highly sensitive to noise, present in a LIVE and Fake image, we remove the noise initially before edge intensity computation in image pixels. We apply Gaussian blur smoothing techniques to finetune the LIVE and Fake images. Intensity identification in image edges is achieved by gradient calculation in the images. Intensity and direction of pixels in an image are identified by the custom filters which detect change on both X-axis as well as Y-axis. In other words, edges in images are areas with strong intensity contrasts i.e. a sudden jump in intensity from one pixel to the next. The process of edge detection and tracking reduces the amount of data filtering out unnecessary information while preserving the important structural information and properties of an image. There are many different approaches and methods that can be used to filter out noise from the images, but we have used the gradient computation for both Real and Spoof images processing before feeding them on to the neural network training for embedding generation as is illustrated in FIG. 9. FIG. 9 illustrates both Real and Fake 2D face images with gradient color intensity visualization for real-fake discrimination optimization. While, extracting the texture of real and fake faces in multiple color spaces and the relative gradient of each image, historical and contextual pixel relevance become very important. Context-based gradient color information, present in a fake and real image, have different contextual pixels around it. A custom-built gradient extractor is used to identify high-intensity, low-intensity and moderate-intensity pixels based on contextual relevance to use them as one of the discriminants for classification purposes. To identity implicit texture pattern in the spatial domain of both real and spoof images, we have used clustering method to cluster at least 3 pixels around a low-intensity pixel to transform weak pixel into a strong one. The clustering method helps in filtering out weak pixels and replace them with strong one for brighter edge intensity. Such, edge intensity approach contributes towards the discriminative feature selection at the time of feature extraction for a neural network training. To obtain the data, prepare and pre-process it the process is split into the following steps: For each frame in a video or in a single frame image:

1. Extract and transform the color-texture information from luminance (grey) and chrominance image channels:

2. Compute the intrinsic disparities and discriminants in color textures between Real and Fake faces 3. Combine texture and color features (RGB, HSV, YCbCr) and computed gradient features.

4. Extract spontaneous blinking with unique wink pattern detection in a 2D planar face with aggregated face segments comparison based on extracted features;

5. Feed the liveness model with the normalized facial image data;

6. Classify face as Real or Fake by a fully connected CNN layer.

Figure 10:
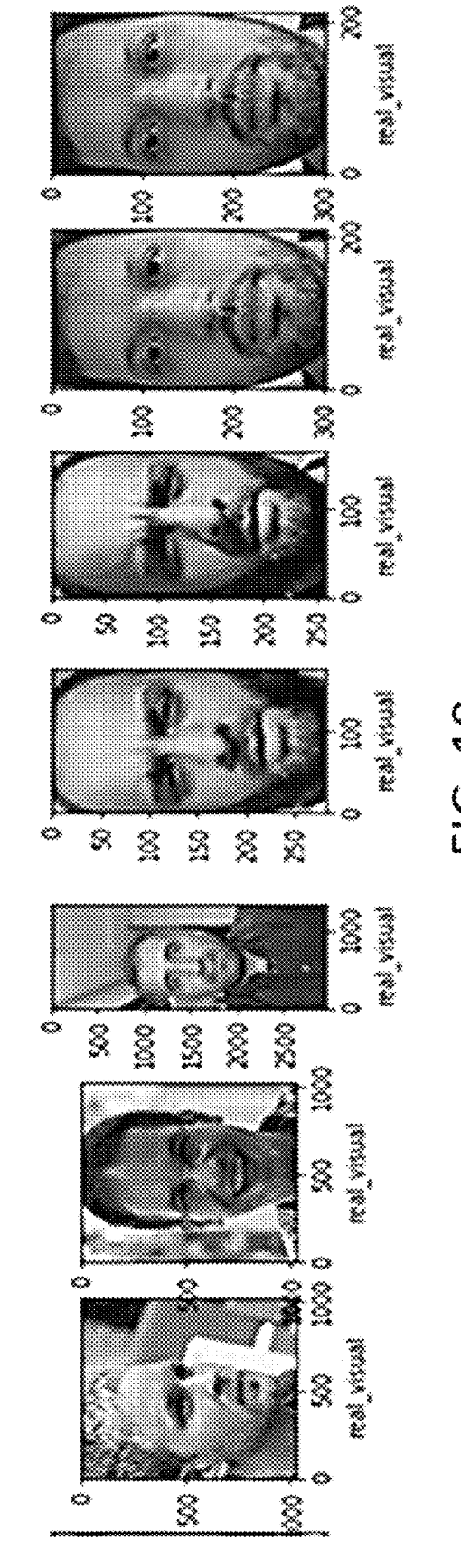
FIG. 10 illustrates a sample of real and fake face images taken from a training dataset.

The combinatorial texture-gradient-blinking diffusion is employed to enhance edges in the input image, then used convolution neural networks to detect face liveness based on the enhanced edges. Multi-faceted color gradient and textured information from both original and fake 2D face images are extracted in different color spaces which lead to a perfect separation between fake and original faces based on chrominance, luminance, texture color and open-close eye spatial variation. In order to prepare a dataset for training, we had adopted a mixed data approach whereby, images containing faces such as shown in FIG. 10 were selected from three different data sources i.e., publicly available datasets, Colleagues face photographs, and friends face photographs. Cloned (replay videos and images) versions of the dataset was created which included face photos of all individuals in the original dataset along with the masked, paper-photographs and photographs extracted out of videos when replayed on mobile devices. The total number of images, containing faces, were 5320 of which 3724 were used for training and 1596 were used for validating and testing. A sample of fake and real face images have been demonstrated in FIG. 10.

Figure 11:
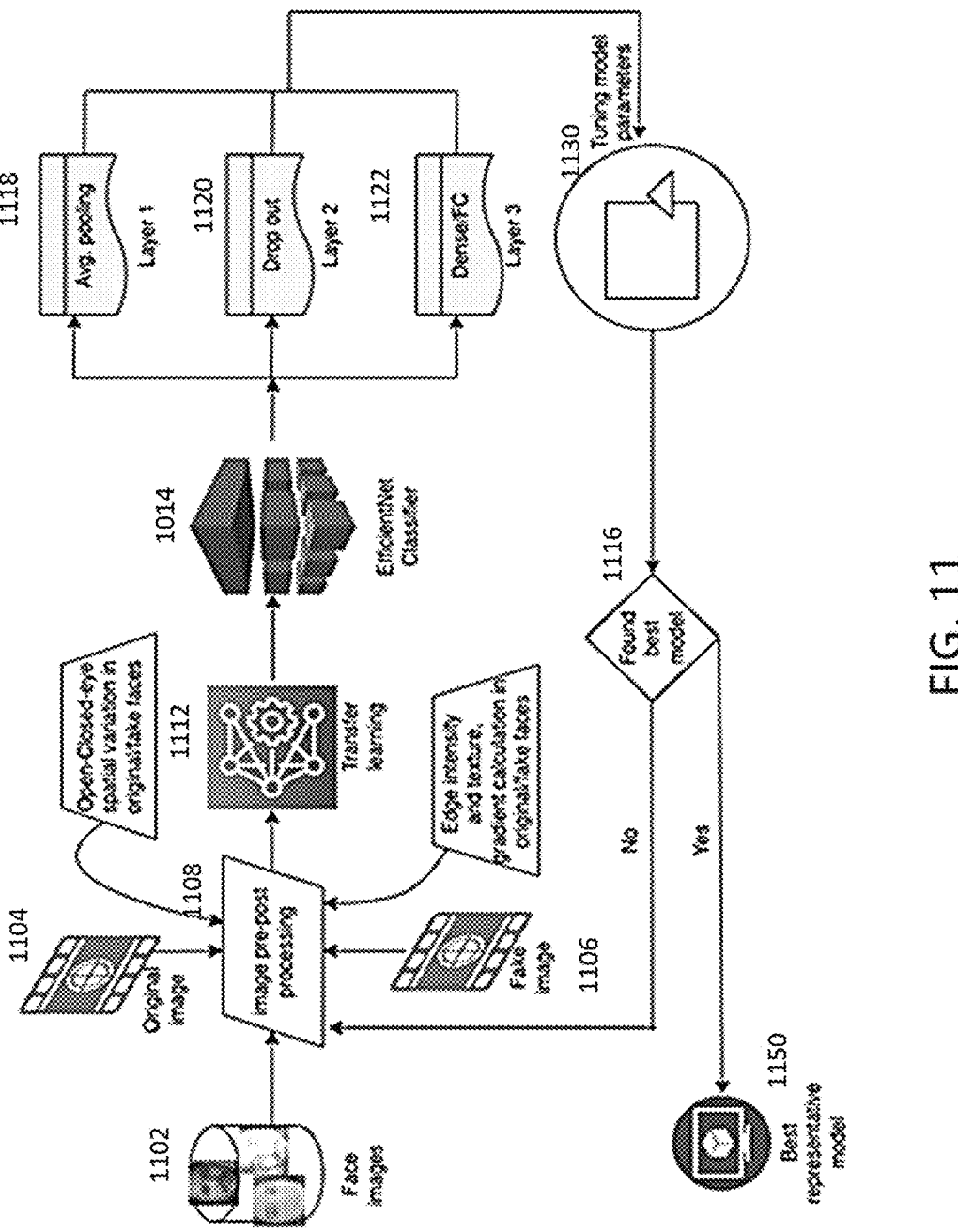
FIG. 11 illustrates the liveness classification model showing various pre and post processing, discriminatory gradient/texture computation as well as neural network layers with input and output.

FIG. 11 illustrates the liveness classification model showing various pre and post processing, discriminatory gradient/texture computation as well as neural network layers with input and output.

Facial images 1102 including real (original) images 1104 and fake images 1106 are considered as is open and closed-eye spatial variations in the original and fake faces. Edge intensity and texture as well as gradient calculation in the images is performed using transfer learning 1112 techniques and an EfficientNet Classifier 1014. EfficientNet 1014 is a family of networks as a face feature extractor, which provides a good combination of efficiency and accuracy. EfficientNet deep neural network architecture works on the idea that providing an effective compound scaling method (scaling all dimensions of depth/width/resolution), for increasing the model size, can help the model achieve maximum accuracy gains in a categorical classification scenarios. However, the input to the model needs to be prepared in such a way where the finetuned version of the model can correctly discriminate between the real and spoof face images. The latter is what we have claim novelty in, and the performance has been optimized by tuning the model parameters 1130 to obtain the best model 1116 and best representative model 1150 after vigorous experimentations and evaluation. The model is benchmarked against a number of datasets where the faces to be tested vary in terms of 2d visual quality, lighting, texture color etc. The model inferencing over a set sample of test dataset reveals the accuracy, prevision and recall measures which help in getting the best model weights which perform comparatively better on a variety of datasets regardless of the above-mentioned variations. Establishing that balance is achieved by data preparation, augmentation and hyper-parameters tuning until optimal model weights are obtained which gives optimally better performance over a number of datasets having images of different visual, texture and environmental quality. FIG. 11 components 1118, 1120 and 1122 of the Convolutional Neural Network architecture represent average pooling 1118, drop out 1120 and Full Connectivity/Dense Layers 1122. As an image goes through pixel-wise convolution and activation function in a CNN network backbone architecture, these layers are needed at the fine-tuning stage to reduce the number of trainable parameters from the model for optimizing the final weights of the model. Global average pooling and drop out layers break the model's linearity based learning and helps it to generalize more accurately (non-linear complex approach) on unseen data with optimum loss function with no tendency towards undercutting or overfitting situations when tested on unseen (data not used in training) data. After the detection of faces, we need to classify each face belonging to a different person and then when that particular face appears in some other image in a different frame, we need to identify it as the same person. This is done by converting each face into a vector and we want these vectors to be similar for the faces of same persons and very different for the faces of a different person. This is where we use ArcFace 1206 which has a special loss function which enables the vectors to be understood as far apart from each other for different people and closed together for faces belonging to the same person. In other words, after having generated the feature vectors, the recognition part is done by ArcFace or Additive Angular Margin Loss, which is a loss function in face recognition tasks.

The additive angular margin loss optimizer, such as ArcFace is used to further improve the discriminative power of the face recognition model and stabilize the training process. Unlike most loss minimization optimizers, an arccosine function is used to calculate angle between the current feature and target weight. Moreover, the ArcFace optimizer substantially addresses the issue of "scale and volume" by correctly classifying faces regardless of the number of identities or faces.

Figure 12:
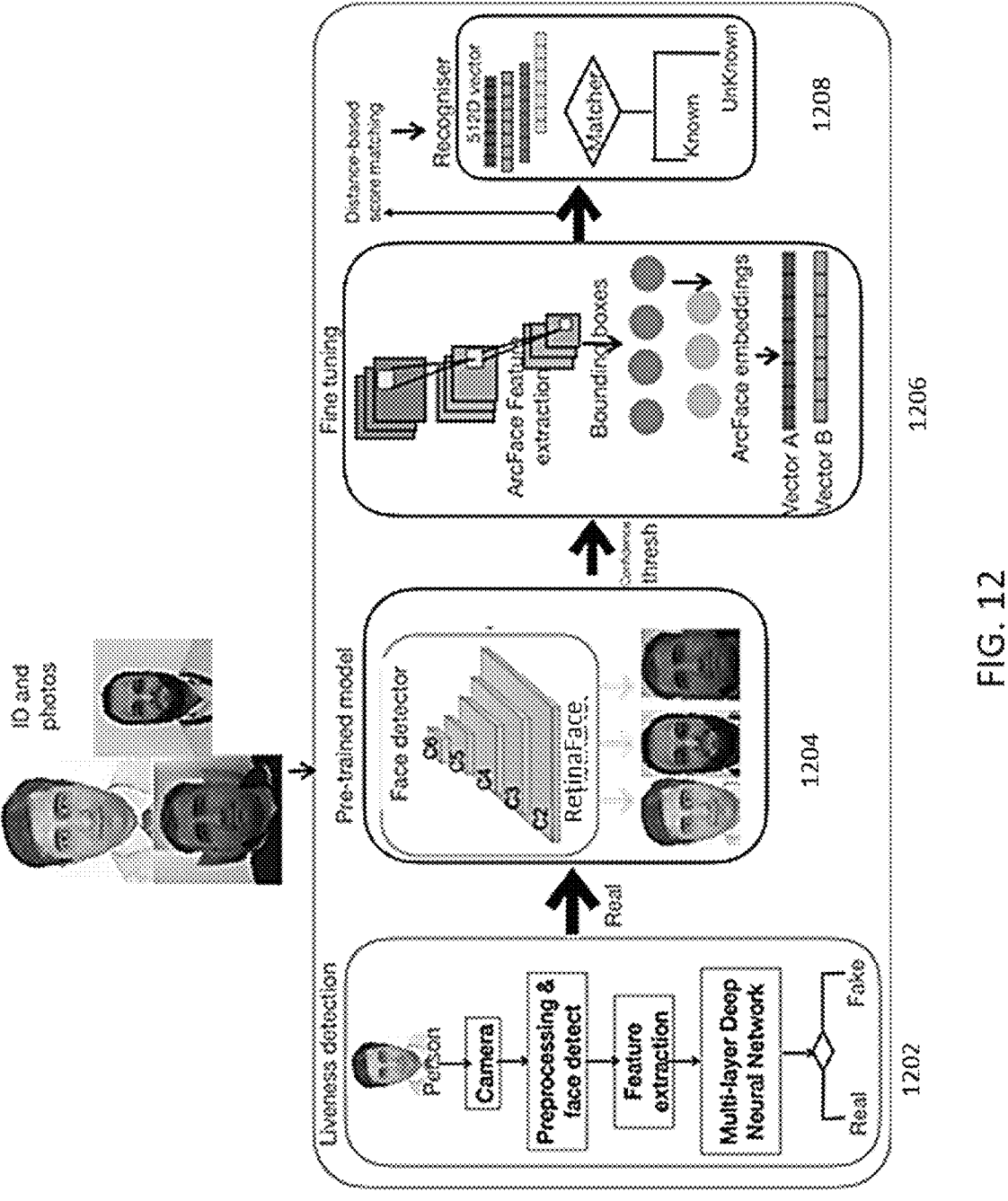
FIG. 12 illustrates Liveness classification model showing various pre-post processing, discriminatory gradient/texture computation and neural network layers with input and output.

As shown in FIG. 12, the ArcFace embedding model 1206 converts detected faces into 512 dimensions feature maps, followed by the quantification process 1208 based on the differences of the embedding vectors, using the cosine similarity distance measures. To discriminate the Known and Unknown face, a NN Matcher algorithm performs classification of a LIVE face against all existing embedded face vectors and output the result in the form of a Known or Unknown face. 1208 Notice that a real image is that of a real person 1202, captured by the camera and subsequently passed on to the RetinaFace detector 1204. A confidence threshold-based frames are passed on to the fine-tuning block 1206 where NN-based feature extractions is performed to get the bounding boxes and get the points converted to ArcFace-optimized embedding vectors.

Figure 13:
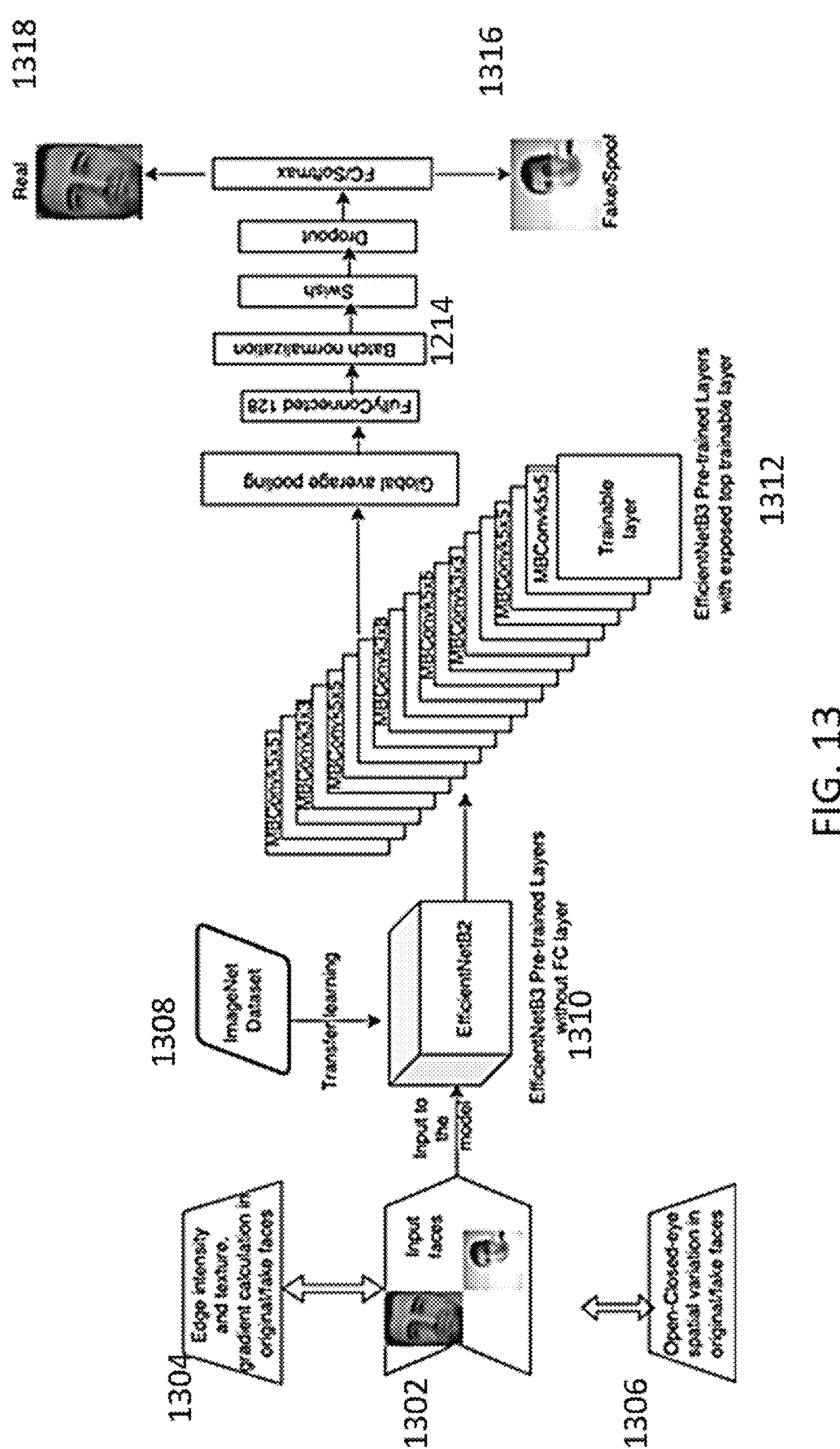
FIG. 13 illustrates results from real-time Liveness detection in various environments while utilizing different devices for real play and photo attacks.

FIG. 13 illustrates a liveness classification model showing various pre-post processing, discriminatory gradient/texture computation and neural network layers with input and output.

Figure 14:
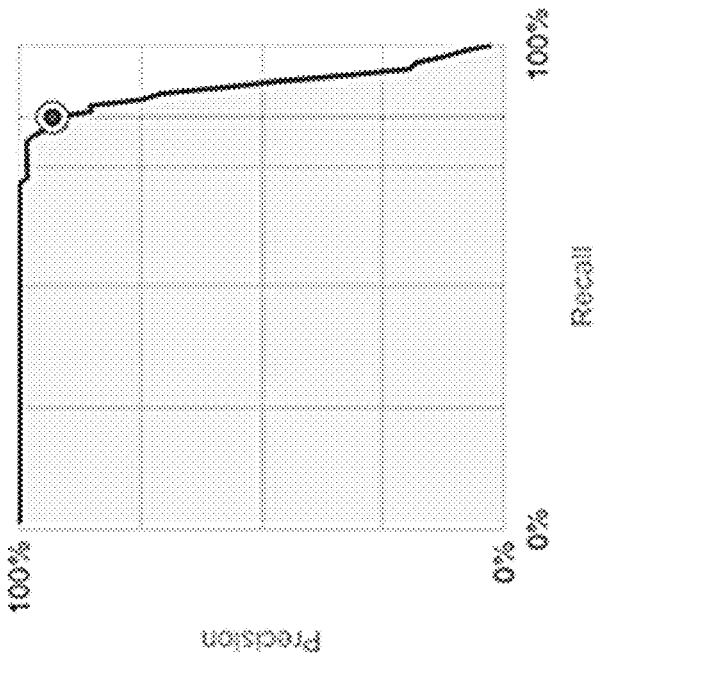
FIG. 14 illustrates the precision and-recall curve analysis to ascertain the accuracy and efficiency of the system.
Figure 14:
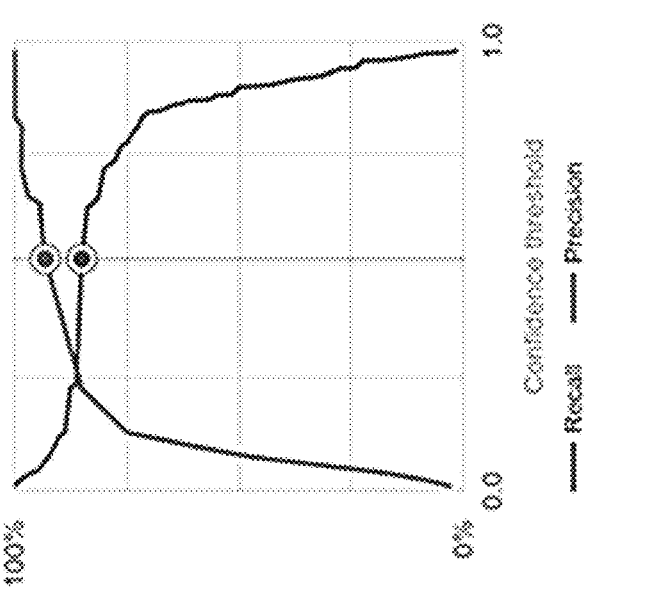

As we can see in FIG. 13, the real and spoofed images 1302 are first processed using methods like image augmentation, gradient, texture-color based segmentation including pixel-intensity detection 1304 and storage to enhance the capacity of image classification model at the time of discrimination. The density of discrimination elements in both real 1318 and fake face images 1316 (due to those processes), provides optimal information to the neural network to get trained on the entire dataset and then classify a face in real-time whether a real or a fake face. When the face is captured by a camera, having the Liveness detection AI module 1306 mounted on it, it activates the detection module 1310 which has face detector, image processing, and optimization process ready to work on the live face 1318. Once, processed, it is forward passed to the finetuned Liveness detection algorithms to identify and feature-extract the spatial receptive fields and then pass it on through different hidden layers 1314 (global max pooling, fully connected, batch normalization, Swish, Dropout and fully connected followed by the last Softmax layer) for convolution, linear/non-linear transformation and finally through classification function called Softmax etc. The iterative process of training our deep neural network took 10 experimental attempts before the performance was optimized enough at the time of validation. The validation and loss function minimization (difference between actual and predicted) happens when evaluation of performance is carried out based on the predicted output from the model and the actual label of the image passed on to the network (a real face looking into the camera). FIG. 14 illustrates the precision and-recall curve 1402 analysis to ascertain the accuracy and efficiency of the system. The precision recall curves analysis is quite important in a binary classification problem such as this one. We wanted to ascertain both the threshold at which precision and recall coincides (precision/recall trade off) as well as maximum area under precision/recall curve 1404 to firm up our confidence in the real/fake face classification. Curve 1404 shows a significantly greater area under the curve which means that both high recall and high precision ultimately cause low false negative rate. Such trade-off makes the system highly reliable at the time of real-time liveness detection.

Figure 15:
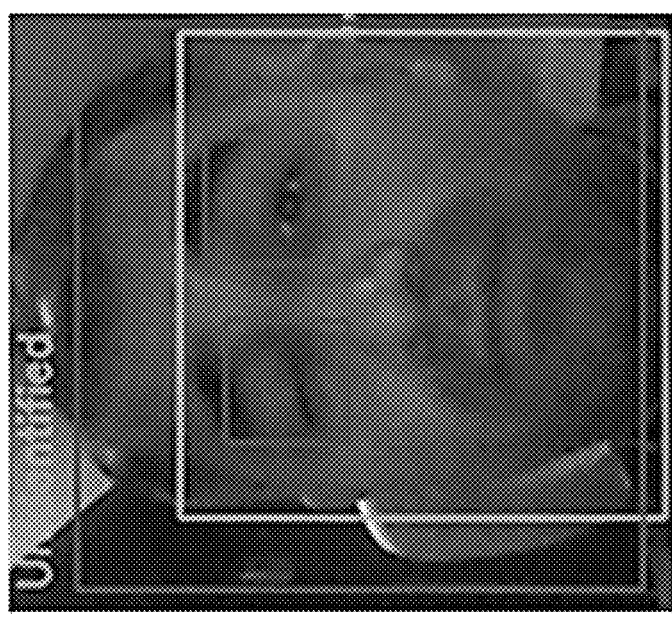
FIG. 15 illustrates the output from the liveness detection and facial recognition modules.
Figure 15:
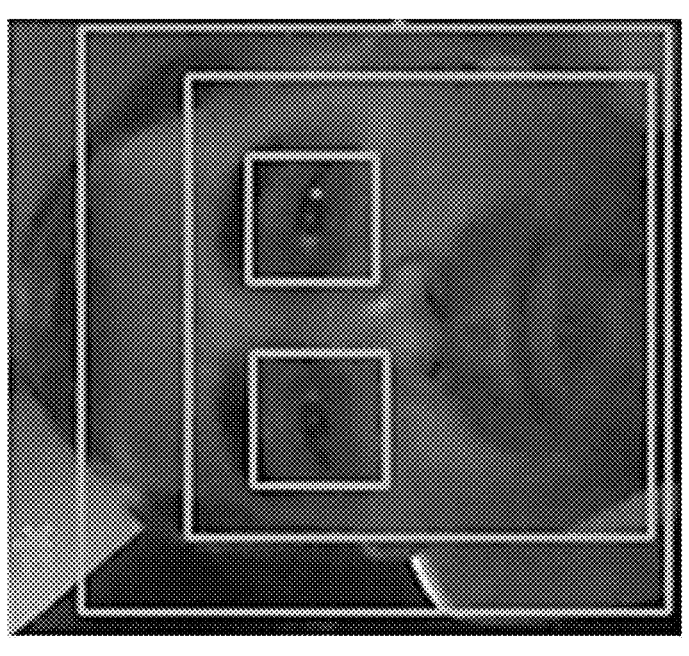

FIG. 15 illustrates the output from the liveness detection and facial recognition module. The blinking (opening and closing of both eyes, either simultaneously or first one eye then the second eye) on various real (3D) faces to consider face cues with eyes opened 1502 and closed 1504 for liveness detection. Once a person is identified as "real" and "recognized", the bounding box color goes green 1502 from red with name of the person shown up on the top left-hand corner of the frame, such as the name "Aak" in 1502.

Figure 16:
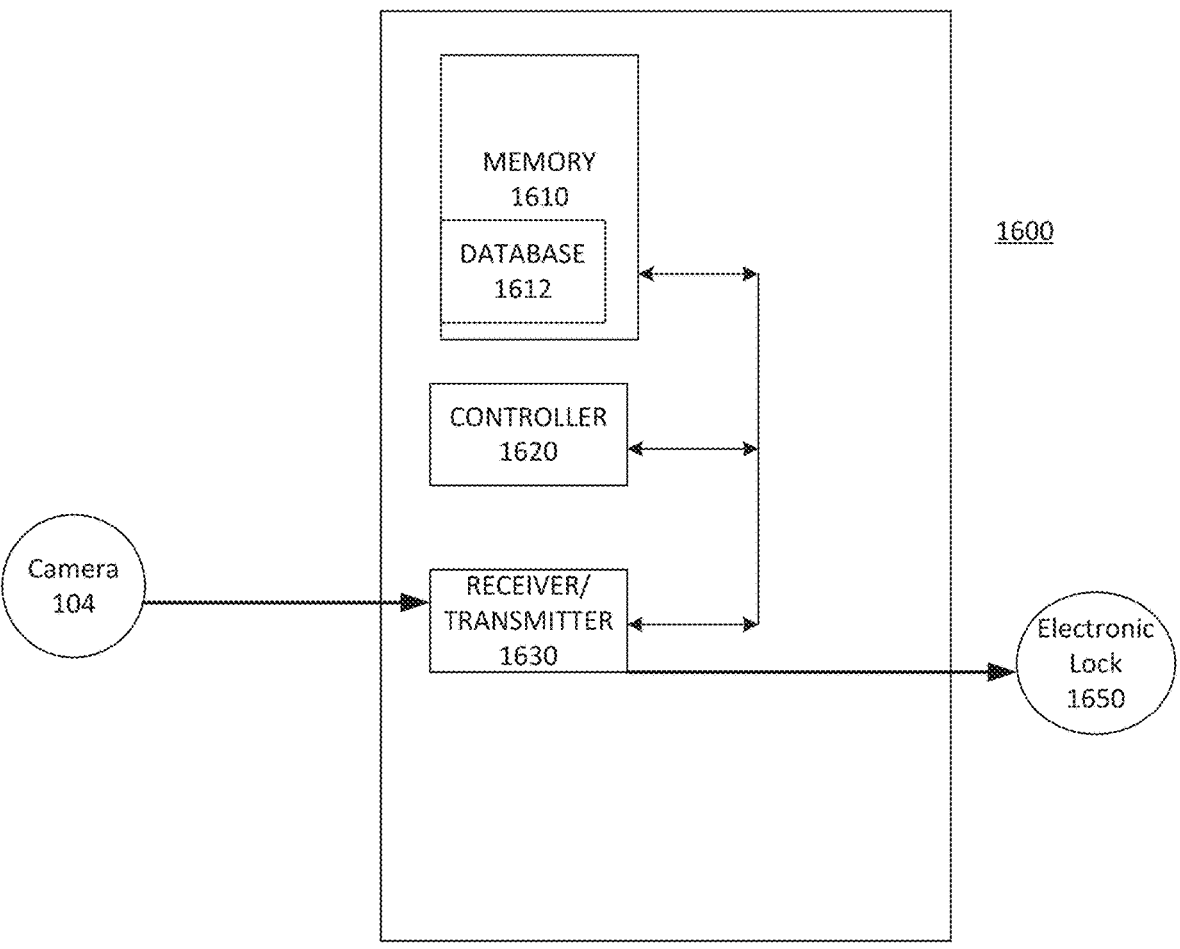
FIG. 16 illustrates a block hardware diagram including a camera, processor, memory, and output device necessary to perform the methods of the present disclosure.

FIG. 16 shows a hardware diagram of the system 1600 including a camera 104, controller 1620, a memory 1610 which may be comprised of RAM, ROM or EEPROM, and contain structures representing one or more trained deep neural network models (not shown in FIG. 16) and the memory may also comprise a database 1612 and a Receiver/Transmitter 1630. The controller 1620 may include one or more microprocessors or a Graphics Processor Unit (GPU), Also shown in the diagram is an electronic lock 1650, such as, for example a lock to a restricted area of a building or a lock to a vehicle. In yet another embodiment, the methods of the present disclosure may control access to, sensitive data, a restricted access to a website or seek verify the "true identity" at a point of interest (POI) as part of an authentication process.

A processor contained in the controller 1630 can be configured to perform various steps described herein and variations thereof. The processor can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU or GPU in the FIG. 16 controller 1630 can execute a computer program including a set of computer-readable instructions that perform various steps described herein, the program being stored in any of the above-described non-transitory computer readable medium, electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS, and other operating systems known to those skilled in the art. Further, CPU can be implemented as multiple processors cooperatively working in parallel to perform the instructions or may be implemented remotely in a cloud based architecture.

The memory 610 can be a hard disk drive, CD-ROM drive, DVD drive, FLASH drive, RAM, ROM, or any other electronic storage known in the art. It is also foreseen that the memory 1610, database 1612, trained neural network model, and/or controller 1620 and/or receiver/transmitter modules may be performed in a cloud architecture.

The method and system described herein can be implemented in a number of technologies but generally relate to imaging devices and/or processing circuitry for performing the processes described herein. The processing circuitry used to train the neural network(s) need not be the same as the processing circuitry used to implement the trained neural network(s) that perform(s) the methods described herein. For example, an FPGA may be used to produce a trained neural network (e.g. as defined by its interconnections and weights), and the controller 620 and memory 610 can be used to implement the trained neural network. Moreover, the training and use of a trained neural network may use a serial implementation or a parallel implementation for increased performance (e.g., by implementing the trained neural network on a parallel processor architecture such as a graphics processor architecture).

In the preceding description, specific details have been set forth. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of the present disclosure. As such, the foregoing descriptions of embodiments of the invention are not intended to be limiting. Rather, any limitations to embodiments of the invention are presented in the following claims.

The invention claimed is:

1. A biometric facial recognition method, comprising:

capturing one or more images of a face by a camera;

storing the one or more images of the face in a memory;

extracting one or more key features of each of the one or more images of the face with a single stage face detector module;

collecting a set of two dimensional feature vectors from the key features;

collecting a set of three dimensional feature vectors from the key features;

collecting spontaneous eye blink information from the one or more images of the face;

detecting liveness of the face based on the collected spontaneous eye blink information, when liveness face is detected:

aligning a geometrical structure and a rotational angle of the one or more images of the face; and performing facial recognition by matching, with a trained neural network model, the one or more key features of the face with encoded features of a known face stored in the memory; and wherein the extracting, collecting, aligning and matching are carried out with a processor connected to the memory, wherein the trained neural network is trained using low quality spoofed faces in a grey-scale space and high-quality real face images in a color space.

2. The method of claim 1, wherein the collecting the set of three dimensional feature vectors further comprises normalizing a colored image of a face into a grey image.

3. The biometric facial recognition method of claim 1, wherein the trained neural network model is trained by observing a closed state of both eyes in one or more face images.

4. The biometric facial recognition method of claim 1, wherein the trained neural network model is trained based upon key features of previous face segments from both high-quality real face datasets and spoofed face datasets, comparing texture, chrominance, and luminance features.

5. The biometric facial recognition method of claim 1, wherein the one or more key features of the images of the face comprise geometric structures including eye, nose tip, mouth corner points, eyebrows, and eye contour extraction.

6. The biometric facial recognition method of claim 1, wherein matching the one or more key features of the face with encoded features of a known face stored with the trained neural network model is based on additive angular margin loss.

7. The biometric facial recognition method of claim 1, that further comprises training a neural network when a new image of a live face is obtained to obtain the trained neural network model.

8. The biometric facial recognition method of claim 1, wherein the single stage face detector module uses a pyramid neural network method.

9. The biometric facial recognition method of claim 1, wherein the set of two dimensional feature vectors comprises a rate and a direction of color change between adjacent pixels in the image of the face.

10. The biometric facial recognition method of claim 9, wherein the direction of color changes between adjacent pixels is measured along an X and a Y axis.

11. The biometric facial recognition method of claim 10, wherein the direction of the color changes are measured in one or more of CIE-LUV, HSV, YCbCr or RGB color spaces.

12. A biometric facial liveness determination system comprising:

a camera configured to capture one or more images of a face, a memory configured to store the one or more images of the face and a trained deep neural network model, and one or more processors configured to extract one or more key features of each of the one or more images of the face with a single stage face detector module;

collect a set of two dimensional feature vectors from the key features;

collect a set of three dimensional feature vectors from the key features;

collect spontaneous eye blink information from the one or more images of the face;

detect liveness of the face based on the collected spontaneous eye blink information, when liveness face is detected:

align a geometrical structure and a rotational angle of the one or more images of the face; and perform facial recognition by matching, with a trained neural network model, the one or more key features of the face with encoded features of a known face stored in the memory; and wherein the trained neural network is trained using low quality spoofed faces in a grey-scale space and high-quality real face images in a color space.

13. The biometric facial liveness determination system of claim 12, wherein two dimensional features and the three dimensional features from the images of the face comprise geometric structures of faces including eye contour information, nose tip, mouth corner points, eyebrows, chrominance, and luminance.

14. A non-transitory computer readable medium having instructions stored therein that, when executed by one or more processors, cause one or more processors to perform a liveness determination method comprising:

accepting two-dimensional feature information of a face from a camera image;

accepting three-dimensional feature information of a face from the camera image;

accepting eye blink feature information of a face;

sending the feature information to a trained deep neural network;

receiving from the trained deep neural network a liveness score associated with the camera image; and comparing the liveness score to a previously determined minimum accepted liveness score to distinguish the face from a spoof attempt, wherein the trained deep neural network is trained using low quality spoofed faces in a grey-scale space and high-quality real face images in a color space.

15. The non-transitory computer readable medium of claim 14, wherein the accepting the two dimensional feature information of the liveness determination method further comprises accepting chrominance and luminance data.

16. The non-transitory computer readable medium of claim 14, wherein the instructions further include the method of:

using a single stage face detector to extract key features of the face;

converting each face into feature vectors;

recognizing each face according to the feature vectors; and classifying each face as a known or unknown face using the feature vectors.

17. The non-transitory computer readable medium of claim 16, wherein the single stage face detector comprises instructions using a pyramid neural network architecture.

* * * * *